Figure 1:
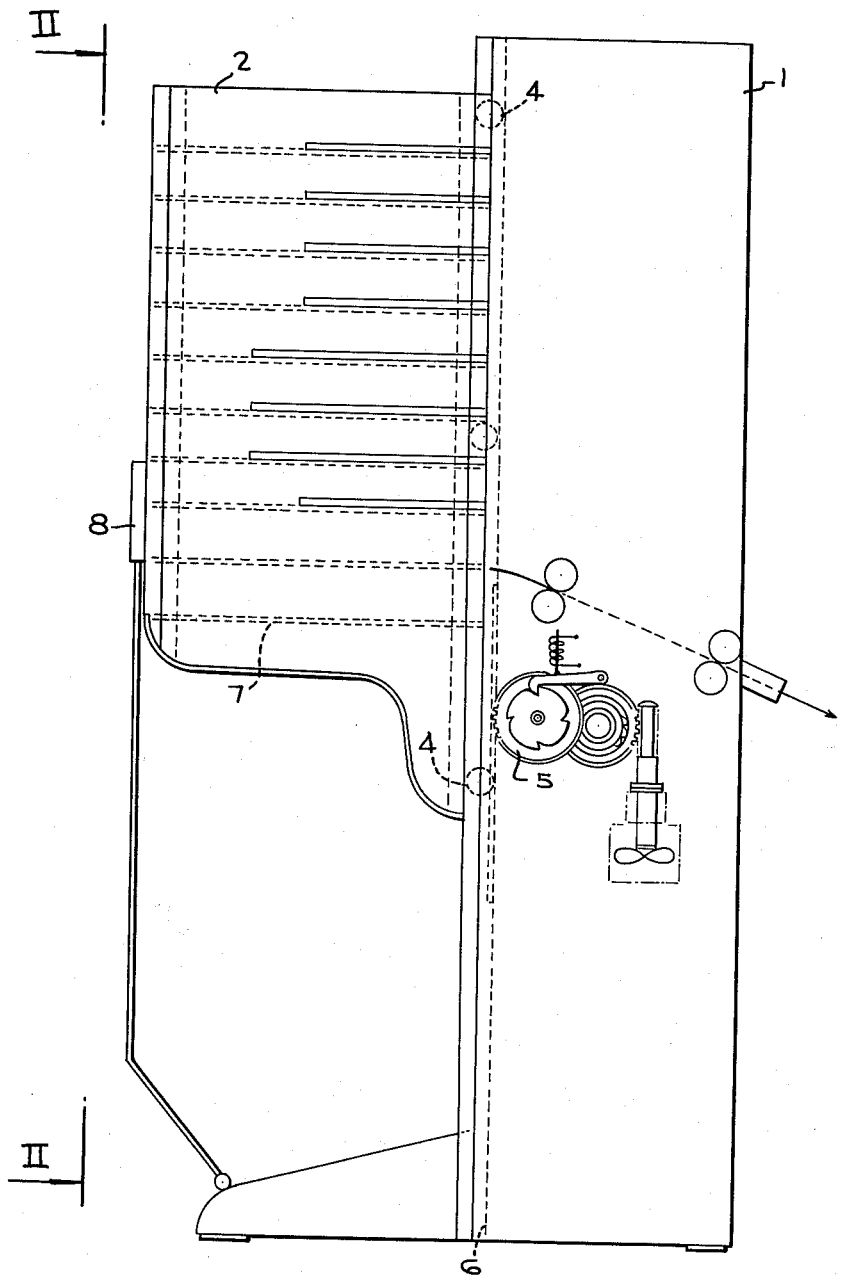

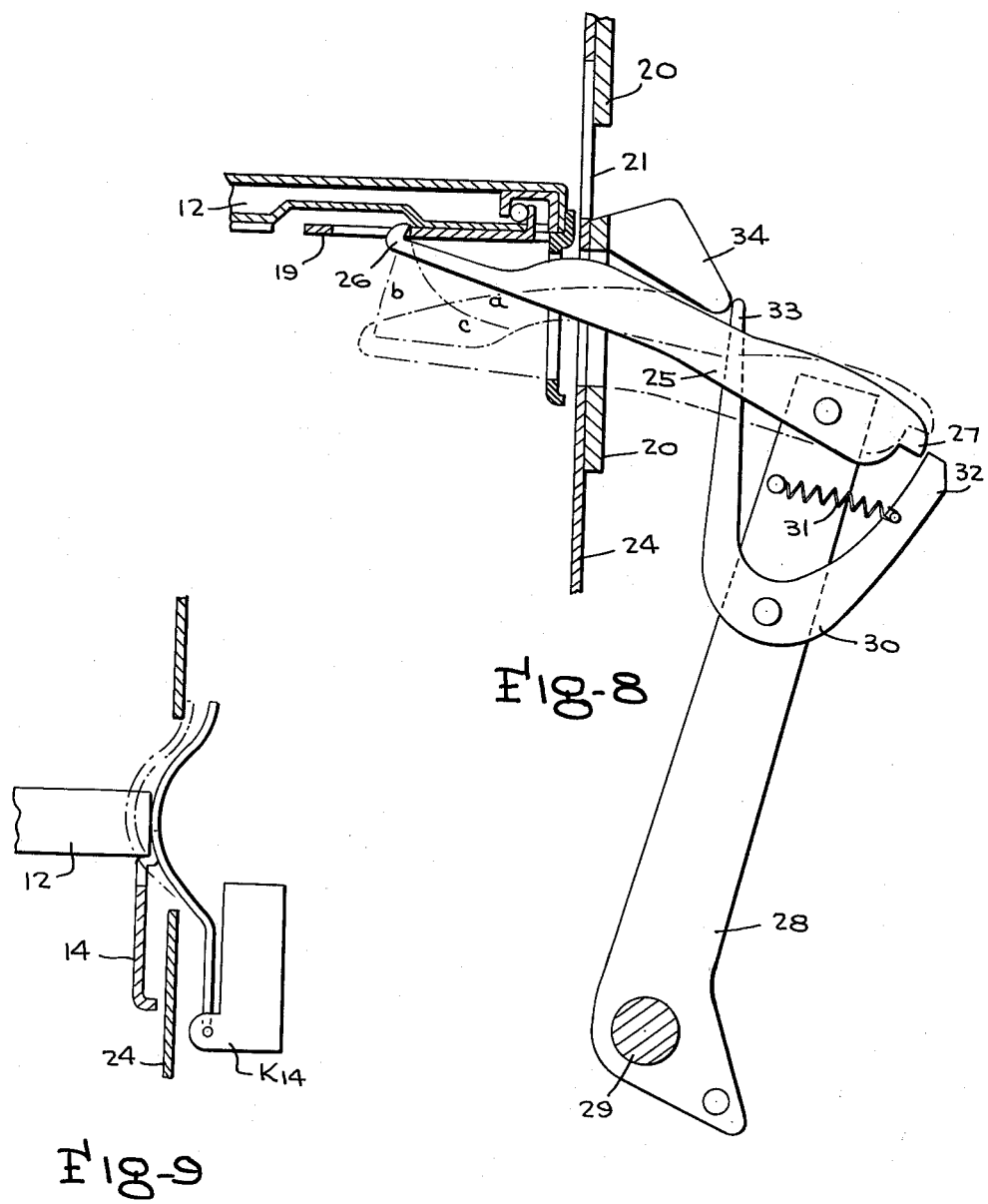

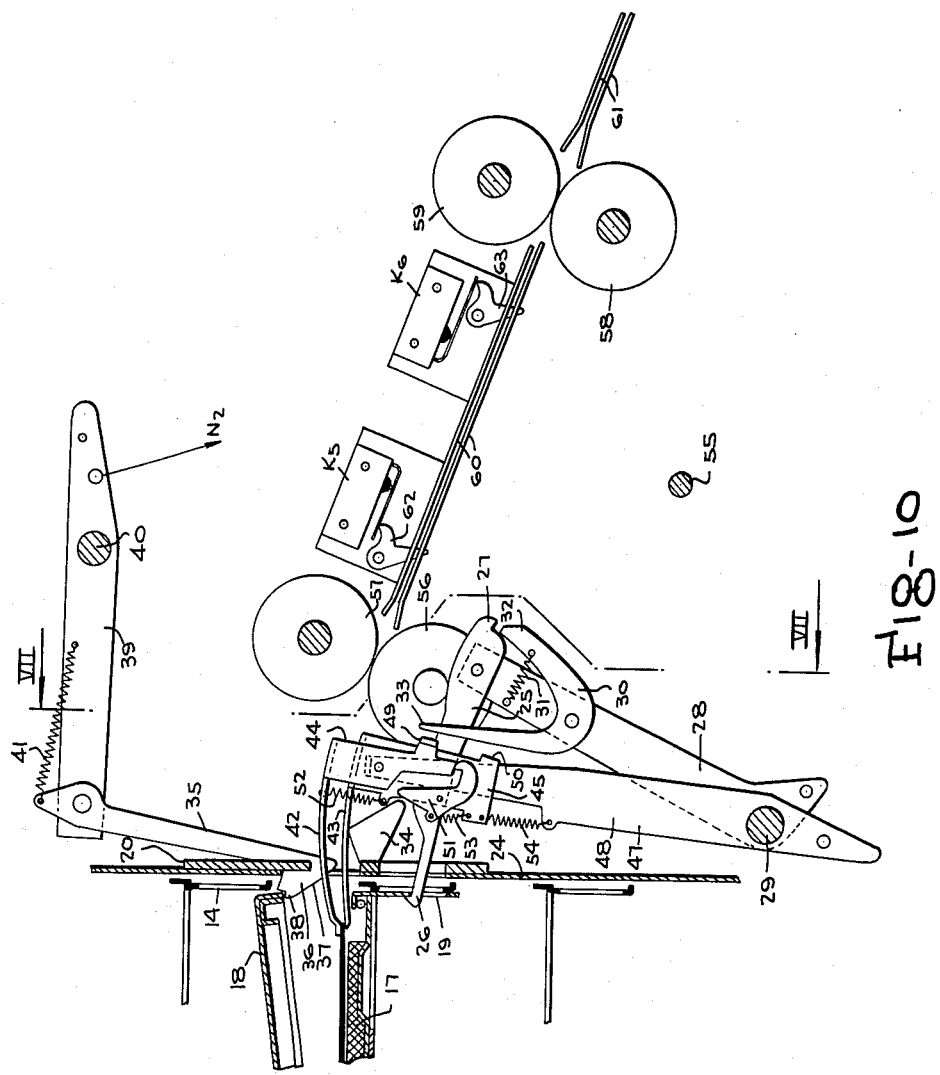

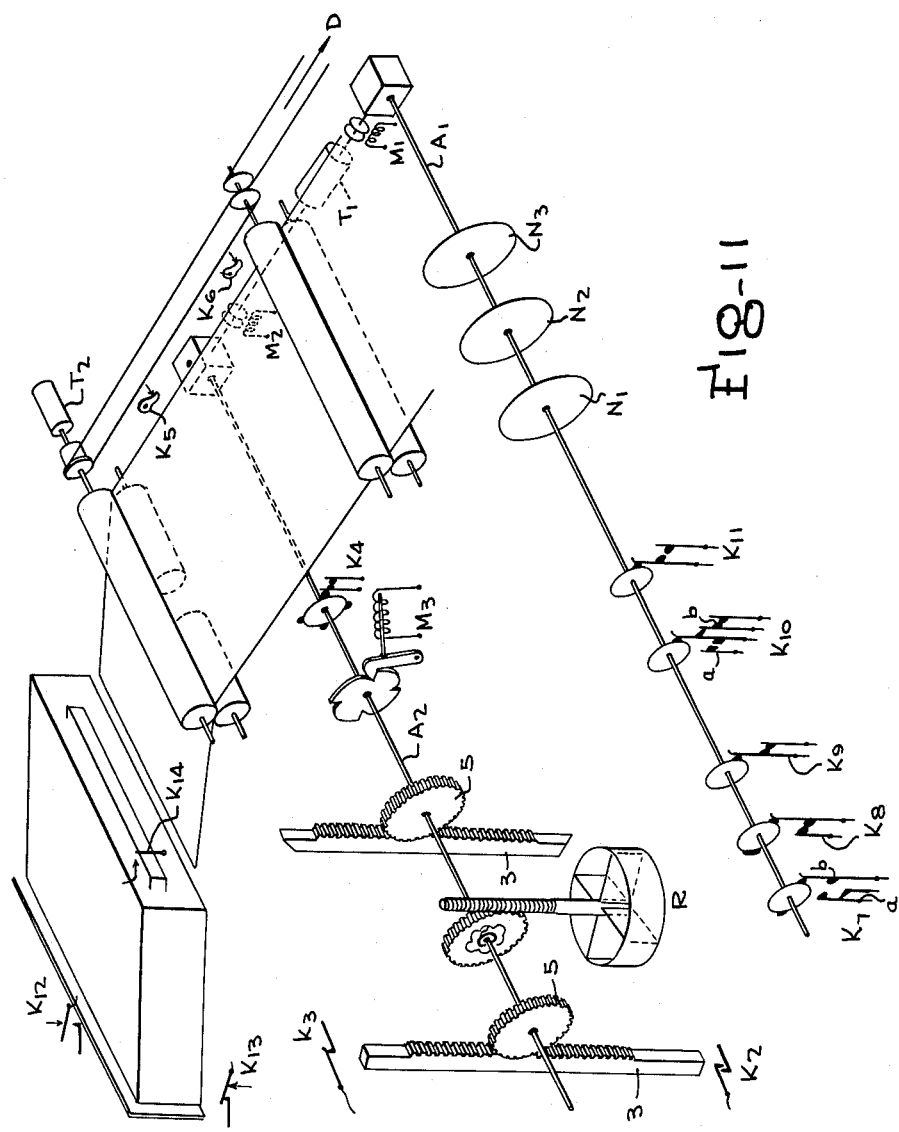

United States Patent Office 3,111,585
Patented Nov. 19, 1963

3,111,585
APPARATUS FOR UNLOADING FILM SHEET CASSETTES
Karel Marcel Sano, Borsbeek-Antwerp, and Frederik Juliaan Van Landeghem, Mortsel-Antwerp, Belgium, assignors to Gevaert Photo-Producten N.V., Mortsel, Belgium, a Belgian company
Filed Jan. 9, 1961, Ser. No. 81,405
Claims priority, application Netherlands Jan. 12, 1960
6 Claims. (Cl. 250—66)

This invention relates to apparatus for unloading film sheet cassettes, especially for X-ray film cassettes. In particular the invention relates to apparatus comprising a movable magazine which contains a number of cassettes.

Certain apparatus are already known for automatically unloading cassettes by using a magazine in which these cassettes are introduced closely spaced from each other. The displacement of the magazine is so regulated that the cassettes are positioned one after another in front of an unloading mechanism. Such an apparatus has already been described in the German patent specification 64,419. Which apparatus shows, however, the disadvantage that special cassettes are required. Each of the cassettes contains a set of film plates and is provided with a toothed side. When a plurality of cassettes of the type now generally used viz. cassettes which have a hinged cover, each of them containing one film sheet, have to be unloaded automatically, the aforesaid magazine system according to the German patent specification 64,419 is not applicable.

This application discloses an apparatus for unloading film sheet cassettes, in particular X-ray film cassettes, in which these cassettes are contained in a movable magazine which positions the cassettes one after another in front of the unloading station of an unloading mechanism, wherein the magazine is divided into a number of sections each of them containing one cassette, the magazine being constructed for introducing the cassettes into and removing them from the sections at one side of the magazine, and for unloading the cassettes at the opposite side of the magazine while during the operation of the apparatus at least one section of the magazine located in front of the unloading mechanism, is closed in a light tight manner by a suitable device while the other sections always remain accessible.

According to a special embodiment of the present apparatus the partitions defining the number of sections of the magazine are step-wise profiled for enabling the unloading of cassettes with different standard sizes.

The unloading of the cassettes comprising the opening of the cassettes, dispensing the film sheet and the conveyance of this sheet may be executed by a device which consists of an unlocking mechanism for opening the cassettes, a gripping mechanism with two jaws for gripping the film sheet and a set of roller pairs for conveying this sheet over a discharge passage for further processing. Such a device is described e.g. in our U.S. patent application Serial No. 46,173.

An apparatus according to the present invention combined with a device according to our aforementioned U.S. patent application Serial No. 46,173 is extremely appropriate for the automatic unloading of a number of cassettes which contain exposed X-ray film sheets, and for guiding the film sheets to a suitable processing apparatus. With regard to the device of our U.S. patent application Serial No. 46,173 the present apparatus shows the advantage that for each unloading cycle there is no need to wait until the unloading operation of a cassette is finished before introducing a following cassette into the apparatus. On the contrary while the unloading of a given cassette is still going on, a set of other cassettes each of them containing an exposed film sheet, may be introduced while the already unloaded cassettes may be removed.

The invention is hereinafter described by way of a construction example and illustrated in the accompanying drawings, without however limiting the scope to this particular embodiment.

Figure 2:
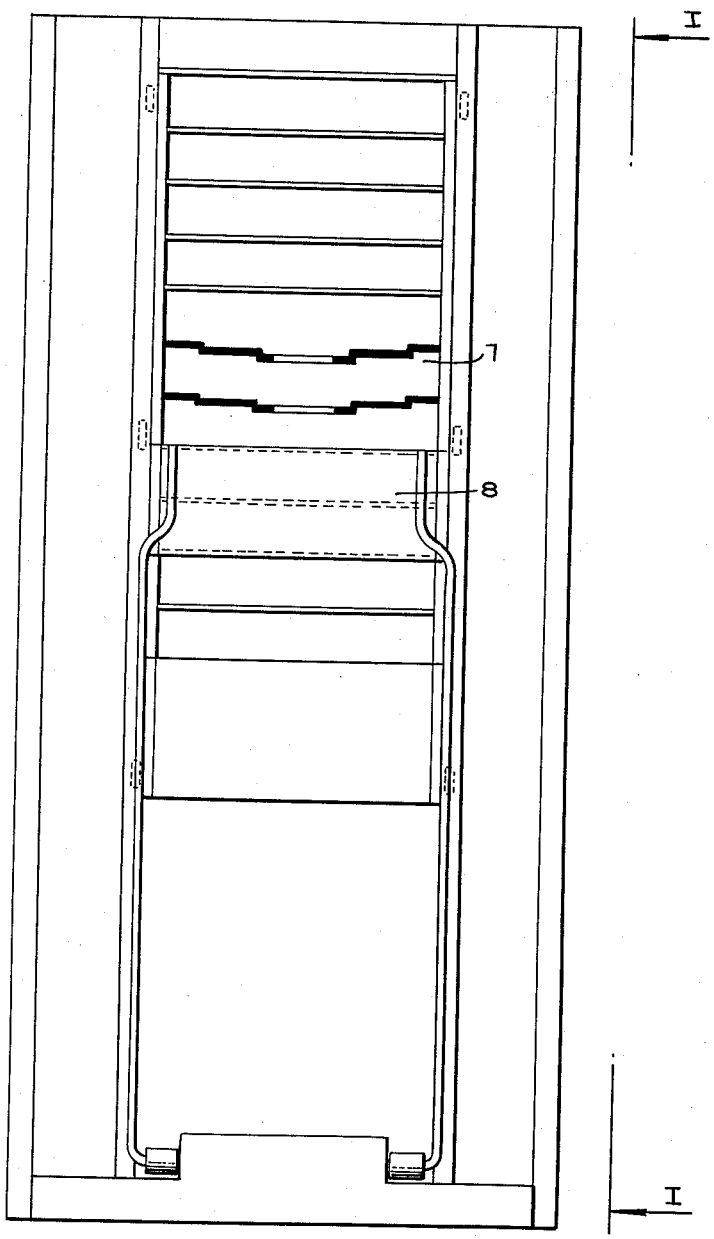
Figure 4:
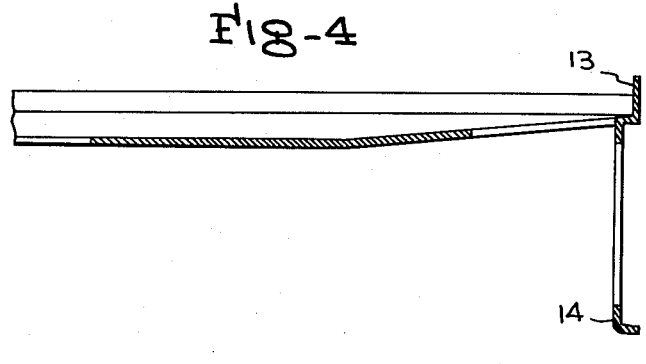
Figure 3:
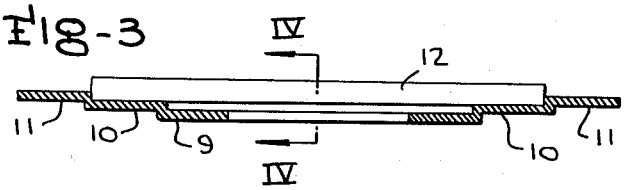
Figure 5:
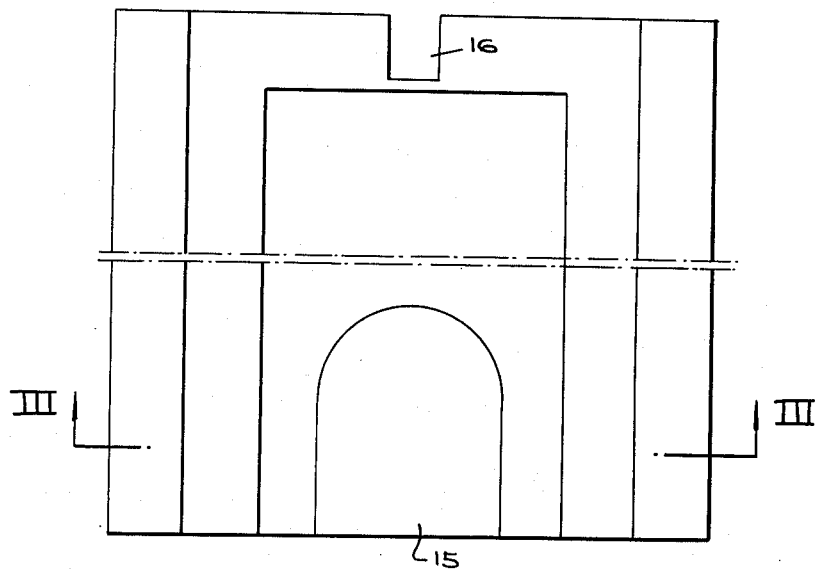
Figure 6:
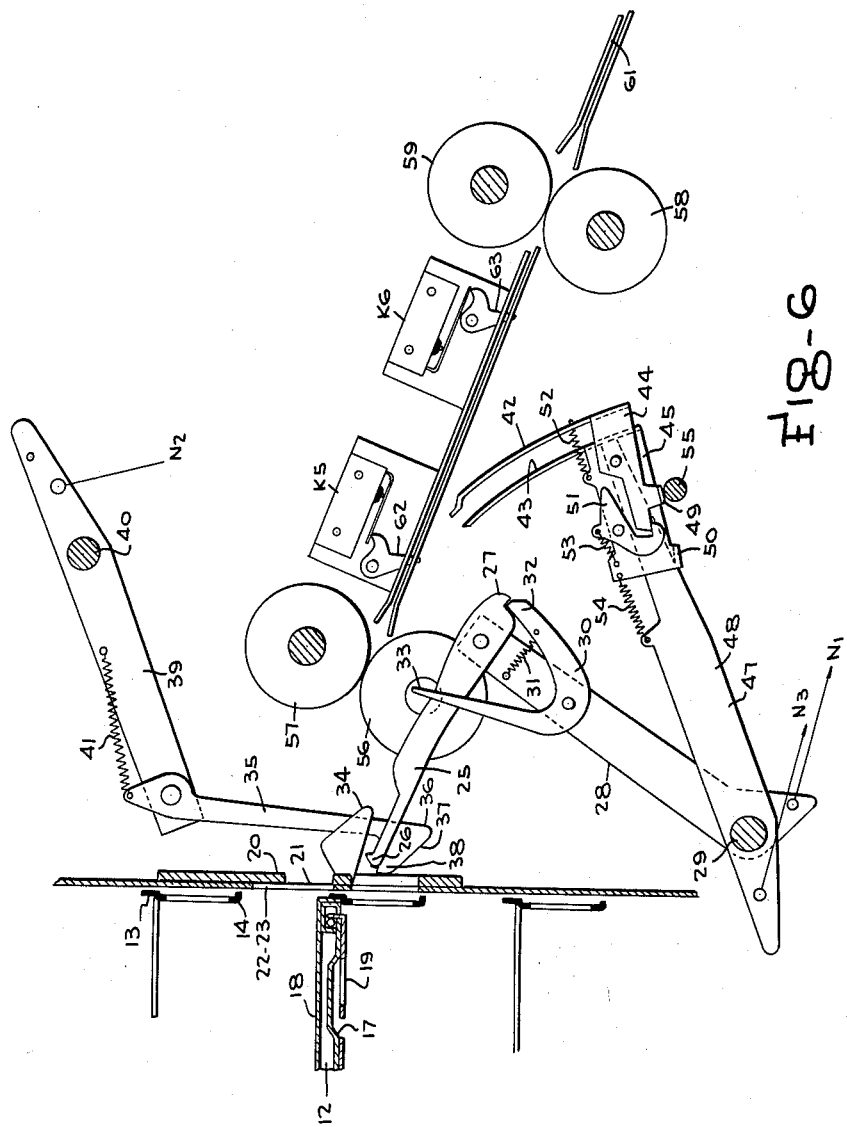
Figure 7:
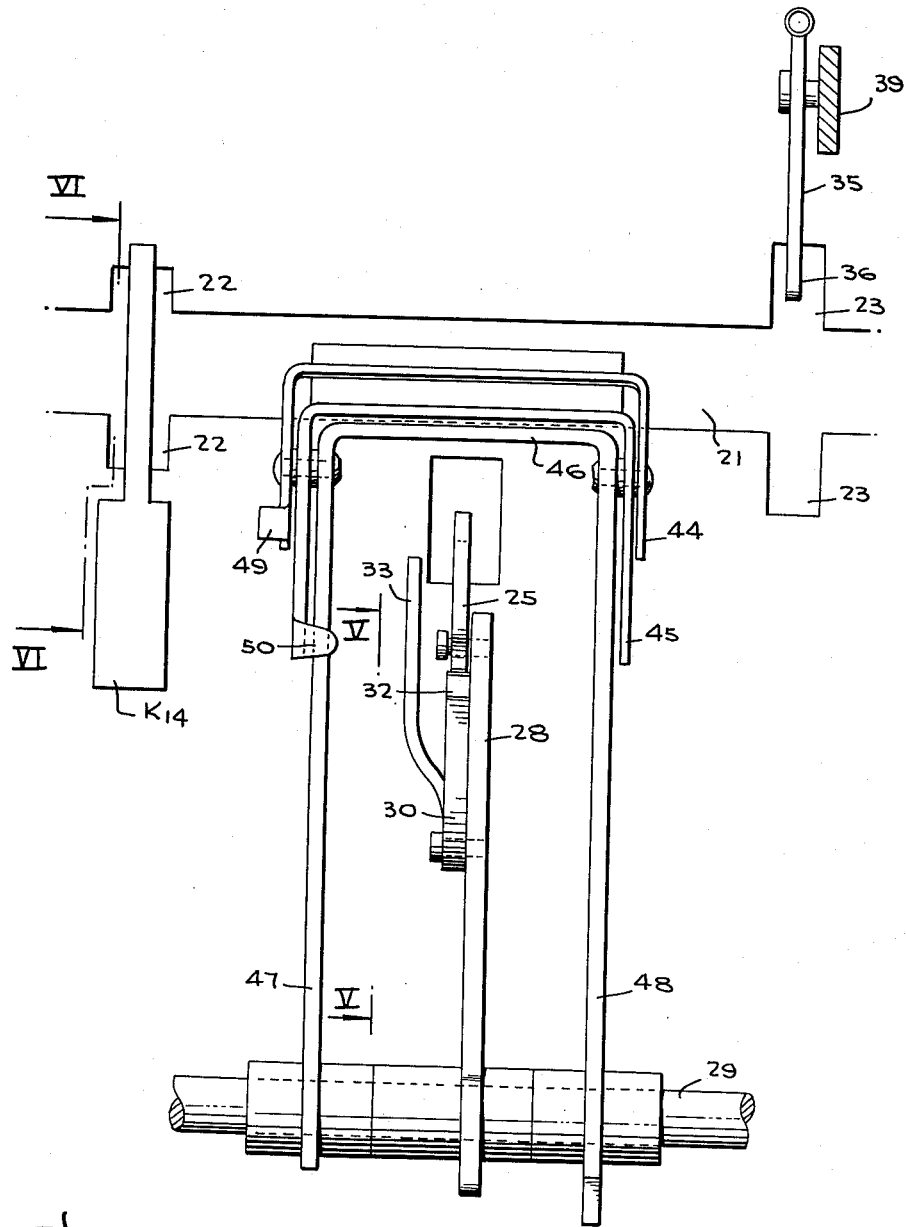
Figure 12:
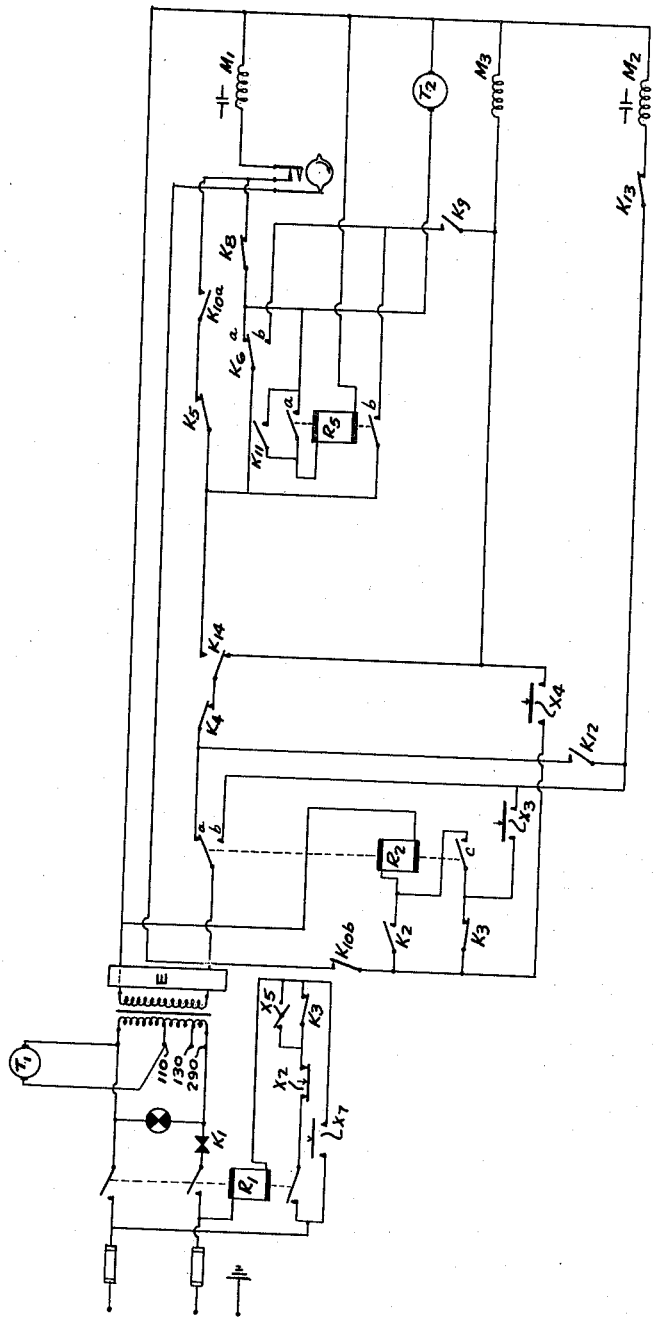
Figure 13:
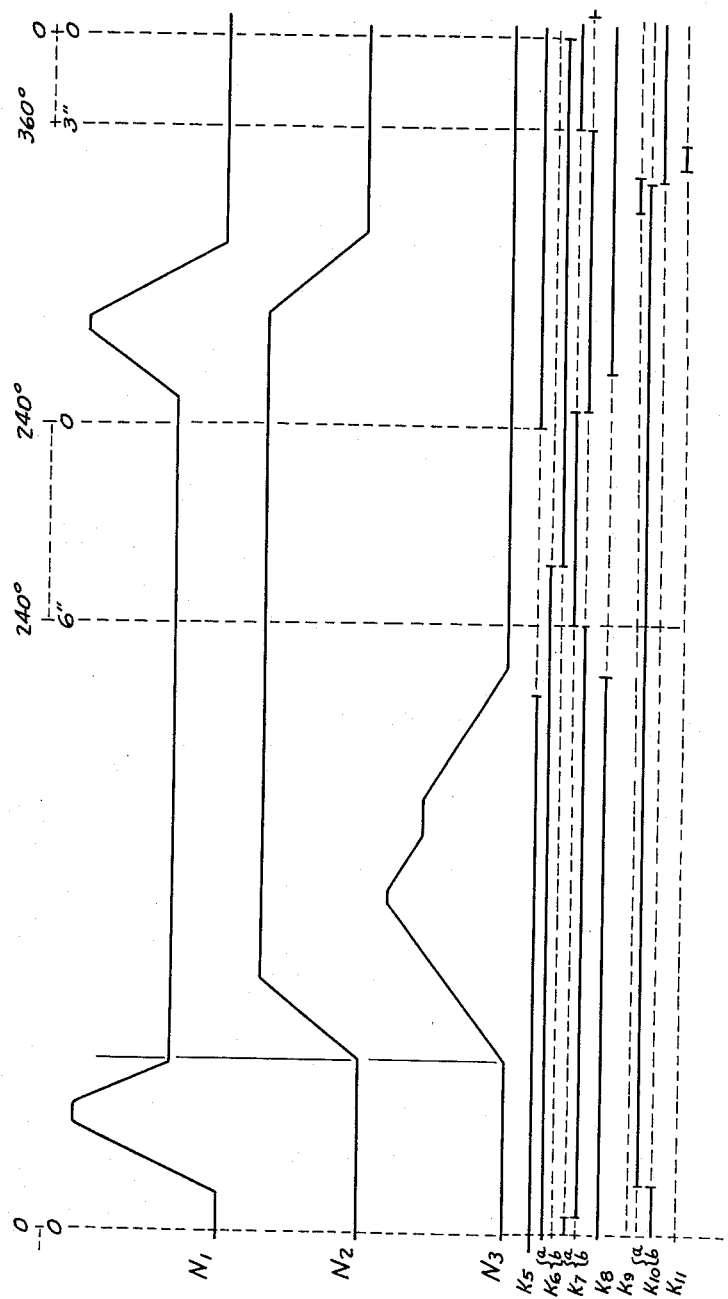

FIG. 1 is a schematic side view of an apparatus according to the present invention along lines I—I of FIG. 2.
FIG. 2 is a back view of the apparatus along lines II—II of FIG. 1.
FIG. 3 is a sectional view of a partition of the magazine along lines III—III of FIG. 5.
FIG. 4 is a sectional view of a partition of the magazine along lines IV—IV of FIG. 5.
FIG. 5 is a top view of a partition of the magazine.
FIG. 6 is a side view of the unloading mechanism in the initial position.
FIG. 7 is a front view of the unloading mechanism along lines VII—VII of FIG. 10.
FIG. 8 is a side view of the unlocking mechanism along lines V—V of FIG. 7.
FIG. 9 is a side view of the cassette-control switch along lines VI—VI of FIG. 7.
FIG. 10 is a side view of the unloading mechanism in operative position.
FIG. 11 is a diagram of the cams and of the electric contacts of the apparatus.
FIG. 12 is the electric circuit of the apparatus.
FIG. 13 is the motion diagram of the cam shaft of the apparatus.

As shown in FIG. 1 a light-tight casing 1 is fixed whereas a cassette magazine 2 is adapted to move vertically with respect to this casing 1, in which the driving mechanism for the whole apparatus has been installed. The magazine 2 contains two toothed tracks 3 and four rollers 4. The pinions 5 engage into the toothed tracks 3 and cause the magazine 2 to move vertically whereas the rollers 4, fitting into the two guideways 6, serve to guide the magazine 2.

The magazine is divided into a number of sections or compartments by means of horizontal partitions 7 (FIG. 2). On each of these partitions a cassette can be placed. A fixed marginal plate 8 having the same width as the width of the magazine, and a height which is at least equal to the height of one section, ensures the light-tight closing of the section containing a cassette which is being unloaded. The partitions 7 are specially shaped in order to guide differently sized cassettes and to hold these cassettes centered. This is done by the step-like profile 9— 10—11 adapted to fit any size of cassette.

FIG. 3 represents a cassette 12 resting on the lower part 10. Longitudinally these lower parts 9, 10 and 11 are rising so as to reach the same level (FIG. 4). If a cassette is placed onto a part of the step-like profile in which it fits, and when this cassette is slid into a forward position to touch an abutment 13 of the border 14, the cassette is always located irrespective its size in the middle against the abutment, at one and the same level.

Each partition 7 is provided with two holes 15 and 16 (FIG. 5). The hole 15 is covered with a thin light-tight rubber strip for the purpose of facilitating the removal, out of the section, of the of the small types of cassettes. Because all cassettes are arranged along the abutment 13, the partitions prevent the easy removal of the smaller sized cassettes. With the aid of the aforesaid rubber strip, fitted in the hole 15, such small cassettes can now be taken in a simple way. The closing of the hole 15 is needed for securing the light-tightness of the section at the moment of opening the cassette.

Through the hole 16 the unlocking member 26 reaches the lock 19 of the cassette. The unlocking member 26 catches behind the lock 19 and pulls it downwardly whereby the frame of the cassette is freed. In FIG. 6 a side view of the apparatus is illustrated. Adjacent the gripping mechanism the front side 24 of the light-tight space is reinforced by a plate 20 which is provided with a number of slots for the purposes of allowing the gripping mechanism to reach the cassette (FIG. 7). The slot 21 is a passageway for the jaws 42—43 of the gripping mechanism and for the dispensed film sheet. The notches 22 are provided for the positioning of the lever of the micro-switch $K_{14}$. Due to the notches 23 the hook portion 36 of the opening mechanism reaches as far as the underside of the cassette frame. Finally there is also a central opening below the slit 21 for admitting the unlocking member 25.

The unlocking mechanism comprises an unlocking bar 25 with a hook portion 26 at one side, and a tooth-shaped portion 27 at the other side (FIG. 6–8). Said bar 25 pivots on the arm 28 rotatably mounted on a shaft 29. The arm 28 is provided with a ratchet 30. Owing to the tension of spring 31 the extremity 32 of the ratchet 30 remains in the rest position under the tooth-shaped portion 27 of the bar 25. At a certain moment when the arm 28 is moving towards the magazine, the extremity 33 of the ratchet 30 abuts against the cam 34 fitted on the plate 20, whereby the ratchet is forced to turn slightly, so that the extremity 32 is sliding from under the tooth-shaped portion 27. In this manner the bar 25 is released and is pulled upwardly by a spring which is not presently shown. The hook portion 26 engages the cassette behind the lock 19. During this operation the hook portion 26 follows the tracks $a$ and $b$ as indicated in FIG. 8. Upon withdrawing the arm 28, the hook portion 26 will unlock the lock 19 over the track $c$.

When reaching the point of intersection of both the tracks $a$ and $c$, the bar 25 has made such a sufficient downward movement that the extremity 32 of the ratchet will regrip under the tooth-shaped portion 27. The arm 28 is further retracted whereby the hook portion 26 is finally located at the end of track $c$. At this moment the cassette has been fully unlocked. For resetting the lock 19, the arm 28 moves again forwardly. Since a spring fitted in the cassette always tends to reclose the lock, the latter follows the hook portion 26 in an upward direction over a track $c$. At the point of intersection of both the tracks $a$ and $c$ the tooth-shaped portion 27 abuts against the ratchet-extremity 32 and the hook portion 26 leaves the track $c$ and enters the track $a$, so that the lock flaps into closed position. While the hook portion 26 continues its course for a while, the arm 28 moves backwardly again and the hook portion returns to its initial resting place over the track $a$.

The opening mechanism consists of a bar 35 with a hook portion 36 which is provided with a sloping side 37 and a border 38. Bar 35 pivots on arm 39 which itself is rotatably mounted on a shaft 40. A spring 41 secures the outward movement of the arm 35. The arm 39 reaches its lowest point when it is in resting position. During this resting position the border 38 rests against the plate 20 below the notch 23 (see also FIG. 7). When the cassette has been unlocked the cassette frame can be lifted. For this purpose the arm 39 moves in the upward direction and consequently the bar 35 with the hook portion 36 is raised. After the border 38 has reached the underside of the notch 23, the hook portion 36 is moved outwardly whereby the sloping part 37 is sliding over the underside of the notch 23. The inclination of the sloping part 37 is made in such a way that the border 38 is capable of gripping exactly under the cassette frame. While the arm 39 is still continuing to move upwardly, the cassette frame 18 is pulled into opened position. For closing this frame the operation occurs in reversed direction and the resting position is obtained when the border 38 rests against the plate 20.

The gripping mechanism is composed of two U-shaped members 44 and 45 which are pivotably connected to a third member 46; the film engaging ends of these jaw-members are resp. 42 and 43. The longitudinal bars 47 and 48 of the member 46 are rotatably mounted on the shaft 29. In the resting position the projection 49 of the member 44 pushes against the stud 55. The member 45 comprises a projection 50 and a pivotable lock member 51. The projection 50 resting against the longitudinal bar 47 controls the displacement of the member 45. With respect to the member 46, this member 45 is rotated to the right by the spring 54. When the gripping mechanism moves in the forward direction for removing a film from the cassette, the lock member 51 abuts against the projection 34. Thereby the jaw members are freed, the film is gripped and the gripping mechanism slides backward so that the film is introduced between the rollers 56—57. At that moment the peripheral speed of these rollers is lower than the speed of the jaws so that the motion of the film sheet is reduced whereby it is released from the jaws. The jaw members are continuing their course until they reach their initial position while the film sheet is conveyed by the discharge rollers. At the end of the retrogressive movement of the jaw-members the projection 49 abuts against the stud 55. The jaws are opened, the spring 53 forces the lock member 51 to re-lock and the jaws remain in opened position, ready for a following operation.

The discharging mechanism consists of a roller pair 56—57, a set of guide plates 60, a roller pair 58—59, a set of discharge plates 61 and the levers 62—63 for actuating the micro-switches $K_5$ and $K_6$. The roller 56 has a cut out part in the middle for allowing the free action of the unloading and gripping mechanisms.

In FIG. 11 a diagram of the electric circuit and the mechanical driving arrangement of the present apparatus is shown. In this diagram, $T_1$ is an electric motor which drives a cam shaft $A_1$ over a first magnetic clutch $M_1$ while the shaft $A_2$ is driven over a second magnetic clutch $M_2$ which controls the displacement of the magazine by means of the rack-wheels 5 which engage into the rack bars 3. A second motor $T_2$ temporarily drives the first film discharging roller pair. This roller pair, together with the second roller pair is normally driven by the developing apparatus D at a peripheral speed which is equal to the capacity of the developing apparatus. During the removal of the film sheet from the cassette, the first roller pair is driven temporarily at a higher speed than the previously mentioned peripheral speed for performing the operations of the ejector in a faster way than normally. This speed however is somewhat lower than the speed of the jaws at the moment of pulling the film sheet out of the cassette so that as already described hereinbefore, the jaws release the edge of the film sheet when the latter is sliding between the first roller pair. As the removed film sheet enters between the guide plates 60, it actuates the switch $K_6$ over the lever 63, the motor $T_2$ stops and the roller pairs are again rotating at the normal speed.

The driving of shaft $A_2$ for displacing the magazine is to be understood as follows. When this shaft turns in a clockwise direction the magazine is moved upwardly. The brake system R is of no influence since the gear-wheel on the shaft $A_2$ which drives the worm, is provided with a ratchet and a ratchet wheel, the latter turning freely during the clockwise rotation of the shaft $A_2$. The ratchet wheel driven by the ratchet of the electromagnet $M_3$ is also turning freely in the clockwise direction. It may be noticed that one turning movement from one indentation of the ratchet wheel to another corresponds to a displacement of the magazine from one section to the following one. When the clutch $M_2$ is not coupled the magazine is blocked by the ratchet of $M_3$. When $M_3$ is energized the magazine will freely move down, at a speed defined by the brake system R which is now operating, since the shaft $A_2$ is rotating counter-clockwise.

Still referring to FIG. 11, the cam shaft $A_1$ is represented in its initial position. On this cam shaft $A_1$ the cams $N_1$—$N_2$—$N_3$ are mounted for resp. actuating the unlocking mechanism (arm 28) the opening mechanism (arm 39) and the gripping mechanism (arms 47 and 48). The arms of all three of these mechanisms are springloaded (not shown in the drawing) in the direction of the marks → indicated in the FIG. 6. The cams for actuating these three arms act opposite to the tension of these springs. Furthermore this shaft $A_1$ is provided with a number of cams for actuating a series of contacts which will be described and explained hereinafter. The apparatus according to the present invention is driven by the shaft $A_1$. One revolution of this shaft $A_1$ corresponds to a complete operation cycle, which means: unlocking and opening the cassette; gripping, removing and discharging the film sheet, relocking again and reclosing the cassette as well as lowering the magazine to a following section. It is to be noted that the cassette lock is repositioned before the cassette frame is lowered. Thereby the cassette frame is maintained on the lock of the hinged lid, so that one can be sure that the cassette has been emptied. The electric circuit of the present apparatus is illustrated in FIG. 12. Besides the elements already mentioned before, a rectifier E and the relays $R_1$—$R_2$—$R_3$ are provided. The rectifier supplies, at 24 V, the current for the whole apparatus excepted for $R_1$ and $T_1$. $R_1$ is an alternating current relay which is directly energized by the line voltage. $R_1$ controls the electric power supply of the apparatus. $R_2$ controls the necessary switching operations when the magazine has reached its highest or lowest position. $R_3$ is a warning relay acting in case the film sheet is either not or otherwise wrongly removed.

The function of the different controls is stated hereinafter the push button Start ($X_1$) normally open, starts the operation of the apparatus. The push button Stop ($X_2$) normally closed, switches off the apparatus. The push button Up ($X_3$), normally open, raises the magazine as long as the button is pushed. The push button Down ($X_4$), normally open, causes the magazine to lower as long as the button is pushed. In any case the magazine will always be lowered until one section is located right in front of the gripping mechanism. The switch Continuous ($X_5$), in closed position, enables the magazine to move up, move down step by step, move up again etc. In the open position of the switch, the magazine will be lowered, step by step, until its lowest position has been reached, next it will rise to maximum height, whereafter the apparatus is switched off.

The indication $K_1$, represents a set of contacts connected in series which serve to control the operation of the apparatus. For example, a micro switch controls whether the plate 8 rests against the magazine and whether this plate closes the respective section light-tightly; an other micro switch controls the cover of the light-tight casing etc. The contact $K_2$, normally open, closes when the magazine reaches its lowest position. The contacts $K_3$ normally closed, open when the magazine has reached its highest position.

The contact $K_4$, normally closed, opens as long as no section of the magazine is in front of the gripping mechanism. The contact $K_5$ normally closed, opens if a film sheet passes underneath 62.

The contact $K_6$ switches over from $a$ to $b$ if a film sheet passes underneath 63.

The contact $K_7$ opens $K_7a$ and closes $K_7b$ as soon as the cam shaft $A_1$ leaves the positions 0° or 240°.

The contact $K_8$ opens at the position of about 240° of $A_1$.

The contact $K_9$, closes at the position of 330° of $A_1$, to excite $M_3$ for a short while, whereby the magazine is lowered to the following section.

The contact $K_{10}$ opens at the position of about 360° of $A_1$ and forces $A_1$ to stop rotating until the chamber is lowered to the following section, $K_4$ is closed again and the previously removed film has been discharged far enough for switching $K_6$.

The contact $K_{11}$ closes after $K_9$ is closed and before the position of 360°. This contact prevents the motion of the magazine in case the film sheet has not been gripped.

The contacts $K_{12}$ and $K_{13}$ serve to protect the operator of the apparatus.

All these contacts are mounted on the plate 8 which secures the light-tight closing of the sections. When the operator's hand is inside the higher or lower located section, it will touch this marginal plate 8 when the magazine is moving.

$K_{12}$, normally open, will change a lowering movement of the magazine into a rising movement, immediately after its closing.

$K_{13}$, normally closed, will change a rising movement of the magazine into a lowering movement immediately after its opening. The damaging of the present apparatus by protruding objects of the magazine is also prevented in this way.

The contact $K_{14}$ switches over only when a cassette is contained in the section which is in front of the gripping mechanism. If it happens that this section contains either no cassette or otherwise an erroneously manipulated cassette, $K_{14}$ does not switch over and the magazine is moved to a following section.

A complete operation is hereinafter described with reference to the FIGS. 11–12–13. A section of the magazine with a cassette containing a film sheet is brought in front of a gripping mechanism. All operating conditions of the apparatus are carried out and $R_1$ is closed. The cam shaft $A_1$ is positioned at 0°. When the push button $X_1$ is pushed, the relay $R_1$ is drawn up. The electric operating circuit for the apparatus is fed by closing two contacts in the line current. By a third contact bridging the push button $X_1$, $R_1$ is maintained in its drawn up state after the release of $X_1$.

Because the location of the magazine is suitably arranged and the cassette has been well introduced, $K_4$ is closed and $K_{14}$ is switched over to the position $a$. Since $R_2$ is not excited and $K_6$ is in position $a$, the motor $T_2$ is energized and drives the first roller pair at an increased speed, presently at 30 r./min. Then $K_8$ is closed, $K_7a$ is also closed, so $M_1$ is excited and the cam shaft starts rotating. After the cam shaft has turned some degrees, $K_7a$ opens and $K_7b$ closes, so that the shaft rotates until reaching 240°, where the second cam closes $K_7a$ and opens $K_7b$. At that moment the current for $M_1$ is interrupted in $M_1$, since $K_8$ has been opened somewhat before 240°. Also the circuit $K_5$—$K_{10}a$ becomes currentless since $K_5$ is opened by the lever 62 which is lifted by the removed film sheet.

When the front edge of the removed film sheet passes under the lever 63 of $K_6$, this contact is switched over to position $b$. The motor $T_2$ stops and the driving goes on at the normal speed of the developing apparatus, in the present case 3 r./min.

During the motion of the cam shaft from 0° to 240° the unlocking, the opening and the gripping movements of the respective mechanisms are controlled by the cams $N_1$—$N_2$—$N_3$. The rotation of the cam shaft $A_1$ will be started again when the film is discharged far enough, this movement being realized by $K_5$. When the rear film edge passes underneath the lever 62, $K_5$ recloses. As $K_{10}a$ is still in closed position and $K_7a$ is closed at 240°, the magnetic clutch $M_1$ is energized again and the cam shaft $A_1$ continues rotating. Upon reaching 360° the mechanism stops since $K_7$ is switched over whereby $K_7a$ has been closed, $K_{10}a$ is opened at 360°, $K_6$ remains in position $b$ as long as the film sheet has not passed underneath the lever 63. Consequently the circuit to $M_1$ is interrupted. At 330° $K_9$ has been closed for a moment whereby $M_3$ was energized, the ratchet was lifted whereby the magazine was lowered to the following section. As soon as the film end has passed underneath the lever 63, the contact $K_6$ is again switched over to $a$, so that the operation cycle may start again.

When the next section of the magazine does not contain a cassette or otherwise, when the cassette has been badly introduced, $K_{14}$ does not switch over and remains in position $b$. Then $M_3$ is excited over $K_4$—$K_{14}$—$K_{14}b$ whereby the magazine is immediately lowered.

When, at a certain moment, the film sheet is either not or incompletely pulled out of the cassette, then $K_5$ remains in a closed position. Consequently the current is not interrupted in $M_1$ when $A_1$ reaches 240° and the cam shaft keeps on rotating up to 360°. The magazine will not descend, because no impulse was transmitted to $M_3$ since $K_6$ remained in the position $a$. If $K_{11}$ closes for a moment between 240° and 360° then $R_3$ will be energized over $K_6a$ while $R_3$ remains in a drawn up position over $R_3a$. The cam shaft starts to perform the following revolution. If now a film sheet is normally gripped and removed from the cassette, $K_6$ switches over whereby the current in $R_3$ is interrupted and the operation cycle goes on as usual. In case still no film sheet is gripped and removed, then $M_3$ is energized over $K_9$ and $R_3b$, whereby the magazine is lowered to the following section, and the operation is continued in the usual way.

Alternatively the circuit may also be designed according to a system wherein a warning signal is provided when the magazine is not lowered after a second trial, etc.

When the magazine has reached its lowest position, $K_2$ closes. $R_2$ is energized and rests energized over $R_2c$ when $K_2$ reopens. The magnetic clutch $M_2$ is energized over $R_2b$ and $K_{13}$. In the highest position of the magazine, $K_3$ opens, $R_2$ is cut off, and the magazine starts a stepwise lowering when $X_5$ is closed. When, however, this switch is in the opened position, the current of $R_1$ is also cut off and the apparatus stops its operation.

We claim:

1. Apparatus for unloading closed cassettes which contain exposed film comprising a movable magazine for receiving and transporting said cassettes successively in front of an unloading station, said magazine including horizontal partitions defining successive sections adapted to receive each one cassette, said cassettes being inserted into and removed from said sections at one side of said magazine, a light-tight housing disposed at the other side of said magazine, said light-tight housing having an unloading station adapted to engage said magazine at said one side in a light-tight manner, means at said other side for light-tightly closing at least the compartment of said magazine positioned in front of said unloading station during the unloading operation, and means at said unloading station for opening said cassettes and for withdrawing the exposed film.

2. Apparatus for unloading closed cassettes which contain an exposed film sheet comprising a magazine for receiving a plurality of said cassettes, said magazine having a plurality of horizontal partitions defining compartments adapted to receive each one cassette, a light-tight housing disposed at one side of said magazine, said housing having an unloading station for said cassette confronting at least one of said compartments and enclosing it in a light-tight manner, said cassettes being inserted into and removed from said sections at the other side, said magazine being movable relative to said unloading station to position said compartments and said cassettes successively in front of said unloading station, means at said other side for light-tightly closing at least the compartment located in front of said unloading station, means at said unloading station for opening said cassettes and means for removing said film sheet from the open cassettes.

3. Apparatus for unloading closed, locked cassettes which contain an exposed film sheet comprising a vertically movable magazine, a plurality of horizontal partitions for supporting said cassettes, said partitions defining separate compartments for receiving and transporting said cassettes, an unloading mechanism mounted in a light-tight housing disposed adjacent one side of said magazine, said housing having a cassette unloading station engaging said magazine in a light-tight manner, said cassettes being inserted into and removed from said compartments on the other side of said magazine, closure means at said other side for closing at least the compartment disposed opposite said cassette unloading station during the removal of the film sheet from the cassette, and means at said unloading station for unlocking said cassettes, for opening said cassettes and for removing the film from said cassettes.

4. Apparatus for unloading closed, locked cassettes as defined in claim 3 wherein said partitions have a first marginal recess at said other side opposite said light-tight housing to facilitate the removal of the cassettes from said compartment and a second marginal recess at said one side to allow said unlocking mechanism to engage and unlock said cassettes.

5. Apparatus for unloading closed, locked cassettes as defined in claim 4 including means for light-tightly closing said first marginal recess.

6. Apparatus for unloading closed, locked cassettes according to claim 5 wherein said means for closing said recess in a light-tight manner consists of a rubber strip.

References Cited in the file of this patent

UNITED STATES PATENTS

| | | |
|---|---|---|
| 1,767,972 | Garretson | June 24, 1930 |
| 2,118,449 | Wantz et al. | May 24, 1938 |
| 2,900,514 | Boucher | Aug. 18, 1959 |